United States Patent Office 2,726,253
Patented Dec. 6, 1955

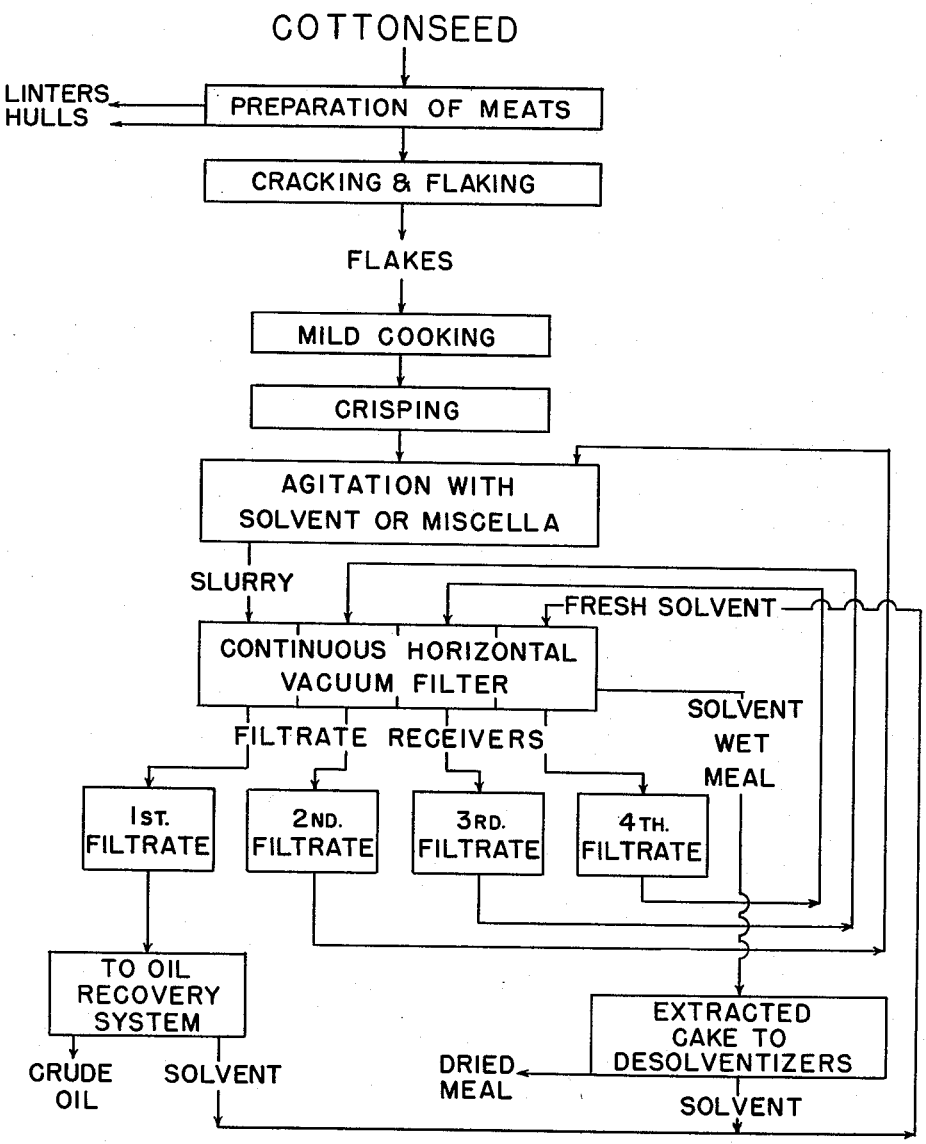
FIGURE I

2,726,253

COTTONSEED OIL EXTRACTION PROCESS

Edward A. Gastrock, Henry L. E. Vix, Esler L. D'Aquin, James J. Spadaro, and Angelo V. Graci, Jr., New Orleans, La., assignors to the United States of America as represented by the Secretary of Agriculture Application March 11, 1952, Serial No. 276,026

6 Claims. (Cl. 260—412.4)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to the solvent extraction of oil from oil bearing materials. More particularly, the invention provides an improved process of preparing oil bearing materials for solvent extraction, which improved process comprises: subjecting the materials to a mild heat treatment, sufficient to make the oil easily extractable but insufficient to seriously damage protein; combined with a crisping treatment, which is a partially dehydrative cooling of the cooked materials that converts them to relatively porous and incompressible granules. In addition, the invention provides a filtration process of solvent extracting the oil from oil bearing materials that have been so prepared, which process comprises, countercurrently mixing the materials with separate portions of solvents, and removing the residual solids from each portion of solvent by means of filtration.

In the present process of preparing oil-bearing materials for solvent extraction, the oil-bearing materials are heat treated and crisped before their oil content is reduced. In the heat treatment, the materials are heated to increasingly higher temperature between about 170° and 235° F. with their moisture content being controlled at between about 14 to 16% in the early stages of the treatment and reduced to about 6 to 12% in the latter stages of the treatment using an overall time of from about 30 to 70 minutes. The hot, treated materials are then crisped by contacting them with a relatively cool atmosphere conducive to the evaporation of moisture until they undergo a uniform reduction in moisture content by about 2 to 4% as well as a temperature decrease to below about 135° F.

The resulting heat treated and crisped materials are then mixed with an oilseed extraction solvent to form a slurry and the slurry is subjected to filtration using a cake thickness of less than about 7 inches and a filter medium having a porosity equivalent in proportion of solids retained and rate of liquid passage to a filter medium consisting of a standard mesh screen of from about 150 to 300 mesh, this mixing with the oilseed extraction solvent and the filtering being repeated a plurality of times.

When cottonseed is the oil-bearing material, and the cottonseed meats to be extracted contain between about 3 and 20% hull fragments, the crisped cottonseed meats, prior to their extraction with a cottonseed oil extraction solvent, are preferably reformed by being passed between flaking rolls adjusted to compress the particle masses to a thickness of from about 0.008 to 0.012 inch. If the cottonseed meats contain less than about 3% hull fragments, the reforming operation can be omitted.

The process provided by the invention can advantageously be used in the solvent extraction of oil from oil bearing seeds having a relatively high oil content, such as cottonseeds, peanuts, sesame, flaxseed, babassu nuts, and the like, as well as in the extraction of such seeds having a relatively low oil content, such as soybean, okra, tomato, and the like, and also in the extraction of oil bearing materials other than seeds, such as rice bran, wheat germ, corn germ, and the like.

The invention provides certain unique advantages and improvements in the solvent extraction of cottonseed and is described herein with particular reference to cottonseed oil extraction.

Solvent extraction provides a means by which more oil than is otherwise obtainable can be extracted from cottonseed. However, the solvent extraction processes heretofore proposed have distinct disadvantages, particularly for the small and medium-sized mills. If the flakes are to be directly extracted, the preparation of the flakes requires numerous steps which must be very carefully controlled in order to minimize the "fines problem" and to maintain a consistently low lipids content in the extracted meal cake. The fines impair the free flow of solvent throughout the mass and meticulous control is necessary to prevent their being carried along with the miscella necessitating additional processing of the miscella prior to solvent recovery. It is known that cooking the flakes to increase the efficiency of direct solvent extraction, by the cooking and solvent extraction procedures heretofore used, increases the fines problem. If the flakes are cooked and prepressed to increase the efficiency of solvent extraction, complex and costly machinery is necessitated and the economic benefits of such an improved efficiency are not within the reach of the small and medium-sized mills.

An object of the present invention is to provide a process of solvent extracting the oil from unpressed cottonseed flakes, in which the flakes are heat-treated to an extent which improves the efficiency of the solvent extraction, and are converted to meal particles which can be removed from miscellas and solvents by filtration, without a fines problem. A further object is to provide a process of mildly cooking and crisping unpressed cottonseed flakes to convert them to a crisp granular material characterized by a high proportion of particles too large to pass a 100 mesh screen, and relatively high degrees of extractability, porosity, and incompressibility. A further object is to provide a continuous process of countercurrently solvent extracting cottonseed meat particles by mixing them with substantially separate portions of solvents for cottonseed oil containing successively smaller proportions of cottonseed oil and removing the residual solids from each portion of solvent by means of a vacuum filtration. A further object is the provision of a process of solvent extracting cottonseed by which process a non-toxic cottonseed meal of high nitrogen content can be produced by a control of moisture and temperature without the use of chemical additives or specialized apparatus. A further object is to provide a process of solvent extracting cottonseed which requires the employment of only a relatively small amount of solvent.

The processes provided by this invention can be applied to substantially any flaked cottonseed meats having a thickness of less than about 0.016 inch produced by the conventional decortication, cracking, and flaking procedures. Such meats are prepared for solvent extraction in accordance with this invention by the conjoint application of steps I and II described below. Such meats are solvent extracted in accordance with this invention by the conjoint application of steps I, II and IV, with step III being applied where desired. Where the production of a non-toxic cottonseed meal is desired, the flaking operation and the moisture content of the cottonseed as it enters the flaking rolls is preferably conducted in the manner described in the application of C. G. Reuther, Jr., M. F. H.

LeBlanc, Jr., F. H. Thurber, and H. L. E. Vix, Serial Number 287,578 filed May 13, 1952, now abandoned.

I. *Mild cooking.*—The flaked cottonseed meats are cooked while controlling their moisture content so that at least in an early stage of the cooking operation the flakes contain between about 14 to 26% moisture. (Throughout this specification, percentages of constituents are calculated on an "as is" basis.) The cottonseed flakes are cooked for an overall time of from 30 to 70 minutes, with their moisture content being allowed to decrease from the relatively high level in the early stages of the cooking operation to from about 6 to 12% in the final stages. The temperature at which they are so cooked is increased from a temperature between about 170 and 210° F. in the early stages of the cooking operation to a temperature of not more than about 235° F. in the final stage.

II. *Crisping.*—The resultant cooked cottonseed particles are exposed to a relatively cool atmosphere conducive to the evaporation of moisture until they undergo a substantially uniform decrease in temperature to below about 130° F., and a substantially uniform loss of moisture sufficient to lower their moisture content by from about 2 to 4%.

III. *Reforming.*—Where the cottonseed meats to be extracted contain between about 3 and 20% of hull fragments, the crisped cottonseed meats are preferably passed between flaking rolls adjusted to compress the particle masses to a thickness of from about 0.008 to 0.012 inch. Where it is desirable, for example where the cottonseed meats contain less than about 3% hull fragments, the reforming operation can be omitted.

IV. *Filtration-extraction.*—The resultant cooked and crisped cottonseed meat particles are mixed with a solvent for cottonseed oil (since some of the cottonseed oil dissolves, this produces a slurry consisting of solid particles of partially de-oiled cottonseed meats mixed with a miscella). The resulting slurry is filtered in a layer of not more than about 7 inches in thickness (i. e., a cake thickness of less than about 7 inches) upon a filtering medium having a porosity equivalent in proportion of solids retained and rate of liquid passage to a filtering medium consisting of a standard mesh screen of from about 150 to 300 mesh. The mixing and filtering is repeated a plurality of times, preferably in accordance with the flow diagrammed on the figure 1 using solvents containing successively smaller proportions of cottonseed oil.

The moisture content of cotton seed flakes extracted by the process of this invention can be controlled so that at least at the early stage of the cooking operation the flakes contain between about 14 to 26% moisture, and preferably contain from about 20 to 25% moisture, by: using a cottonseed having such a moisture content prior to decortication, and decorticating, cracking and flaking it under conditions under which the moisture content remains within such limits; by adjusting the moisture content of the cottonseed meats to within such limits prior to decortication, cracking or flaking; by adjusting the moisture content of the cottonseed meats to within such limits within about the first quarter of the cooking operation; and by adjusting the moisture content during the conductance of such steps so that the specific limits are attained within about the first quarter of the cooking operation. An alteration of the moisture content, where required, can be accomplished by the conventional methods of dipping, spraying, steaming, air drying and the like. It is generally preferable to make any necessary adjustments of the moisture content during the first quarter of the cooking operation.

The mild cooking of the flakes is preferably conducted in a plurality of stages in which the flakes are agitated for substantially equal periods. The flakes are preferably heated to progressively higher temperatures. The flakes are preferably heated to from about 190° F. in the first stage, and held there for about 10 to 15 minutes. If an adjustment of the moisture content is necessary it is preferably made while the flakes are in the first stage. The flakes are then held for about an equal time in 3 or 4 additional stages in which their temperature is increased in successive increments to about 220° F. while the moisture content is decreased to about 10%.

The hot cooked flakes are preferably crisped by subjecting them to a gentle agitation exposing as much surface as possible to a cooling and drying atmosphere until their present total moisture content has been lowered by about 2.5% while their temperature has been lowered to below about 130° F. The crisping can be conducted by forcing any non-reactive relatively dry and cool gas into intimate contact with the surfaces of the hot cooked cottonseed meat particles. Agitating the particles on conventional tray driers or open conveyors, or forcing air through one space of a cooking vessel such as a conventional stack cooker constitute preferred methods of conducting the crisping operation.

The combination of the above defined mild cooking and crisping operations produces a unique and valuable result in the preparation of cottonseed meat particles for the herein described cottonseed oil extraction process. As is known to those skilled in the art, because of the low thermal conductivity of cottonseed meats, in order to prevent localized overheating, such meats must be agitated while they are being heated—consequently the heating operations as heretofore practiced, reduced the easily crumbled cottonseed meat flakes to an excessive amount of fines. In the present mild cooking operation, a relatively low temperature is applied for a relatively short time during which the moisture content of the meats is at a relatively high level in the early stages and is decreased during the operation. In such a cooking operation the fine particles appear to agglomerate into larger particles. The crisping operation appears to remove enough water from such particles to markedly increase the porosity and structural strength of their surfaces. The particles produced by the combined operations are relatively large, porous, and incompressible.

Since the hull particles in cottonseed meats cooked in the above manner are relatively large in comparison to the cooked meat particles, since they tend to be curled around the cooked meat particles, and since they are relatively impervious to the solvents for cottonseed oil; when more than about 3% of hull particles are present in the meats, the cooked meats are preferably subjected to the reforming operation defined above in order to allow a high degree of solvent and meat contact and the resultant high degree of oil removal.

Substantially any of the conventionally used oilseed extraction solvents can be employed as the solvent with which the mildly cooked and crisped meats are extracted in accordance with the process of the present invention. The commercial hexanes, the methylpetanes, and trichloroethylene are particularly suitable. While the solvent first mixed with such meats can contain from 0 to about 20% of cottonseed oil, miscellas containing from about 9 to 14% cottonseed oil are particularly suitable. The amount of solvent to be used in any particular case, is principally a matter of economics, particularly in respect to the upper limits. The considerations involved in using more solvent to obtain efficient extraction and the added expense that this introduces in solvent recovery are well known to those skilled in the art. However, the present process can be conducted with as little as 0.6 part by weight of the solvent (based on hexane) being used per part of cottonseed flakes. The present process is preferably conducted by using about 1 part of solvent per part of cottonseed flakes. This is only about one third of the amount of solvent usually used in the present commercial processes of solvent extracting unpressed cottonseed meats.

An agitation of the mixture of cottonseed particles with the initial portion of solvent (which preferably is a miscella) can be accomplished by the conventional procedures for intimately mixing solids with a liquid. The use of a screw type conveyor with paddle-type blades set to agitate as well as convey has been found to be particularly suitable. As will be apparent to those skilled in the art, the time for which the prepared cottonseed meat particles are agitated in the initial portion of solvent with which they are mixed can be varied widely depending upon the concentration desired for the miscella sent to the oil recovery system, the number of portions of solvent with which each portion of meal is to be mixed and the like factors. The use of times of from about 10 to 20 minutes is preferred.

The slurries produced in conducting the process of this investigation can be filtered using substantially any type of a continuous or non-continuous filter. The use of a continuous horizontal vacuum filter having a plurality of spaces in which a substance supported on the filtering medium can be substantially separately mixed with liquids and filtered to yield separate filtrates has been found to be particularly suitable. Where the liquid removal is not aided by reduced pressure the use of a filtering apparatus fitted with a means of agitating the filtering medium is preferred.

Although the filtration-extraction process provided by this invention can be conducted in a batch-wise manner using non-continuous filters, continuous operation is preferred.

The filter medium used in the filtration of the slurries is partially de-oiled cottonseed meals in miscellas can be any type of a filter medium. Whether or not a given filter medium can be used can readily be determined by comparing the filtration characteristics of that filter medium with those of filter mediums consisting of standard mesh wire screen of from 150 to 300 mesh in the filtration of a slurry prepared in accordance with the process of this invention. If the filter medium being tested exhibits a rate of miscella flow and a proportion of fines passed through substantially equal to those exhibited by one of those standard screens, the medium being tested can be used. Screens or cloth filter mediums composed of non-porous strands are preferred. Dutch twill wire filter screens which are, respectively, 20 by 250 mesh screens composed of wires of 0.0016 inches in diameter, and 24 by 110 mesh screens composed of wires of 0.0045 inches in diameter have been found to be particularly suitable.

The following experimental results are presented to illustrate in more detail certain features involved in the practice of this invention. However, as it is apparent that numerous variations can be made it practicing the invention, the scope of the invention is defined by the claims and is not to be construed as being limited to the particular materials and conditions used in the described experiments.

*Example I*

Decorticated, cracked and flaked cottonseed meats having a hull content of 15%, a moisture content of 6.8% and a flake thickness of about 0.010 inch were heated to about 206° F. in the first ring of a ring-type stack cooker. The moisture content was raised to about 25.8% while the flakes were agitated in this ring. After about 12 minutes the flakes were advanced to a lower ring and heated to about 215° F. while the moisture content was allowed to decrease so that by the time the flakes had been heated in three additional rings to respectively about 217, 213, and 223° F. for about the same length of time in each ring, the moisture was reduced to about 12.0%.

The resultant mildly cooked material was crisped by spreading it in layers about 1½ inches deep on the trays of a conventional air drier and gently agitating the hot cooked material until its temperature was lowered to about 130° F. and its moisture content was lowered to about 10.4%.

The resultant mildly cooked and crisped material was reformed by passing it between smooth flaking rolls set to compress the particle masses to a thickness of from about 0.008 to 0.012 inch.

The resultant particles were continuous countercurrently extracted with hexane in an amount of 1 part per part of starting material. The extraction was conducted in accordance with the flow diagram illustrated in the figure. The initial mixture of particles and solvent (a hexane miscella containing about 11% oil) was agitated in a paddle-type mixing conveyor for about 12 minutes. The resulting slurry was spread to a cake thickness of about 1 to 2 inches on the filter medium of a continuous rotary vacuum filter, fitted with a filter medium consisting of a 24 by 110 mesh Dutch twill wire screen composed of wires having a diameter of 0.0045 inch and fitted with a plurality of spaces in which the particles could be substantially separately mixed with liquids and filtered to yield separate filtrates. The filtrations were conducted using a reduced pressure supporting 125 mm. of mercury and the overall filtration rate was 10 pounds of liquid per square foot per minute.

The miscella sent to the oil recovery system contained 26% oil and 0.13% solid meal particles. The extracted cake contained 27.8% residual solvent, 0.8% lipids, had a soluble nitrogen content of 25.7% and a free gossypol content of 0.03%. The crude oil refined by the A. O. C. S. official method Ca 9a–41 to a Lovibond color, 35 yellow and 5.79 red and bleached by the A. O. C. S. official method Cc 13B–45 to a Lovibond color 20 yellow and 1.19 red.

*Example II*

The importance of the mild cooking and crisping operations is demonstrated by the fact that when cottonseed meats analogous to those used in Example I were adjusted to a moisture content of 8.5% before flaking and these flakes were directly subjected to an entirely analogous filtration extraction: the filtration rate was impractically low, 1.1 pounds of filtrate per square foot per minute using a cake thickness of 2 inches and a reduced pressure supporting 559 mm. of mercury (a lower pressure could not be used because of the tendency of the particles to compress into an impervious mass); the proportion of residual solvent in the extracted cake was relatively high, 51.9%; the proportion of residual lipids was impractically high, 4.69%; and although the proportion of soluble nitrogen was 71.0%, the free gossypol content was 1.07%.

*Example III*

The importance of the reforming operation where the meals used contain more than about 3% hulls is demonstrated by the fact that when cottonseed flakes analogous to those used in Example I were cooked in an analogous manner using ring temperatures of, respectively, 188, 212, 220, 233, and 234° F. and adjusting to between 17–20% moisture in the first ring and to 10–13% final moisture, were crisped in an analogous manner and were subjected to an analogous filtration extraction: the filtration rate was 9 pounds per minute per square foot, using a reduced pressure supporting 51 mm. of mercury; the proportion of residual solvent in the extracted cake was 20%; but the proportion of residual lipids was high, 2.7%. The crude oil was comparable in color to the oil produced by the process described in Example I.

We claim:

1. A process of solvent extracting cottonseed oil from cottonseed, comprising mildly cooking cottonseed meat flakes having a thickness of less than about 0.016 inch and containing more than about 3% hulls while controlling their moisture content so that in the early stages of the cooking the meats contain between about 14 to 26% moisture and in the final stages of the cooking they contain about 6 to 12% moisture, using an overall cooking time of from about 30 to 70 minutes, and increasing the cooking temperature from an initial temperature of from about 170 to 210° F. to a final temperature of less than about 235° F.; crisping the cooked meats by exposing them to a relatively cool atmosphere conducive to the evaporation of moisture until they undergo a substantially uniform decrease in temperature to below about 130° F. and a substantially uniform loss of moisture sufficient to lower their moisture content by from about 2 to 4%; passing such crisped cottonseed meat particles between smooth flaking rolls adjusted to compress the particle masses to a thickness of from about 0.008 to 0.012 inch; and mixing the so prepared cottonseed meat particles with an oilseed extraction solvent, subjecting the resultant slurry to filtration using a cake thickness of less than about 7 inches and a filter medium having a porosity equivalent in proportion of solids retained and rate of liquid passage to a filter medium consisting of a standard mesh screen of from about 150 to 300 mesh, and repeating the mixing with the said oilseed extraction solvent and the filtering a plurality of times.

2. A process of preparing cottonseed meat flakes for oil extraction, comprising mildly cooking cottonseed meat flakes having a thickness of less than about 0.016 inch and containing from about 3 to 20% hulls while controlling their moisture content so that in the early stages of the cooking the flakes contain between about 14 to 26% moisture and in the final stages of the cooking they contain about 6 to 12% moisture, using an overall cooking time of from about 30 to 70 minutes, and increasing the cooking temperature from an initial temperature of from about 170 to 210° F. to a final temperature of less than about 235° F.; and crisping the cooked material by exposing it to a relatively cool atmosphere conducive to the evaporation of moisture until it undergoes a substantially uniform decrease in temperature to below about 130° F. and a substantially uniform loss of moisture sufficient to lower its moisture content by from about 2 to 4%.

3. A process of solvent extracting cottonseed oil from flaked cottonseed meats, comprising heating cottonseed meat flakes containing from about 3 to 20% hulls in a plurality of stages by agitating the flakes for from about 10 to 20 minutes in each of a plurality of stages maintained at successively increased temperatures, raising the moisture content of the flakes to from about 20 to 25% in the first stage while raising their temperature to about 190° F., and lowering the moisture content of the flakes to a final moisture content of about 10% while raising their temperature to a final temperature of about 220° F.; crisping the resulting flakes by gently agitating a relatively thin layer of the cooked flakes until their moisture content is about 6.5% and their temperature is below about 130° F.; reforming the crisped, cool flakes by passing them between smooth flaking rolls set to compress the particle masses to a thickness of from about 0.008 to 0.012 inch; and mixing the cooked, crisped and reformed cottonseed meat particles with an oilseed extraction solvent, subjecting the resultant slurry to a vacuum filtration using a cake thickness of less than about 7 inches and a filter medium having a porosity equivalent in proportion of solids retained and rate of liquid passage to a filter medium consisting of a standard mesh screen of from about 150 to 300 mesh, and repeating the mixing with the said oilseed extraction solvent and the filtering a plurality of times.

4. A process of solvent extracting cottonseed oil from cottonseed, comprising: mildly cooking cottonseed meat flakes having a thickness of less than about 0.016 inch while controlling their moisture content so that in the early stages of the cooking the meats contain between about 14 to 26% moisture and in the final stages of the cooking they contain about 6 to 12% moisture, using an overall cooking time of from about 30 to 70 minutes, and increasing the cooking temperature from an initial temperature of from about 170 to 210° F. to a final temperature of less than about 235° F.; crisping the cooked meats by exposing them to a relatively cool atmosphere conducive to the evaporation of moisture until they undergo a substantially uniform decrease in temperature to below about 130° F. and a substantially uniform loss of moisture sufficient to lower their moisture content by from about 2 to 4%; and mixing the so prepared cottonseed meat particles with an oilseed extraction solvent, subjecting the resultant slurry to filtration using a cake thickness of less than about 7 inches and a filter medium having a porosity equivalent in proportion of solids retained and rate of liquid passage to a filter medium consisting of a standard mesh screen of from about 150 to 300 mesh, and repeating the mixing with the said oilseed extraction solvent and the filtering a plurality of times.

5. A process of preparing an oil-bearing vegetable material for solvent extraction comprising heat treating the material by heating it to increasingly higher temperatures between about 170 and 235° F., while controlling the moisture content at between about 14 to 26% in the early stages of the treatment and reducing the moisture content in the latter stages of the treatment to about 6 to 12% moisture, using an overall time of from about 30 to 70 minutes, and crisping the material by contacting the hot material with a relatively cool atmosphere conducive to the evaporation of moisture until the material undergoes a uniform reduction in moisture content by about 2 to 4% as well as a temperature decrease to below about 130° F.

6. A process of solvent extracting an oil-bearing vegetable material comprising heat treating the material by heating it to increasingly higher temperatures between about 170 and 235° F. while controlling the moisture content at between about 14 to 26% in the early stages of the treatment and reducing the moisture content in the latter stages of the treatment to about 6 to 12% moisture, using an overall time of from about 30 to 70 minutes; crisping the material by contacting the hot material with a relatively cool atmosphere conducive to the evaporation of moisture until the material undergoes a uniform reduction in moisture content by about 2 to 4% as well as a temperature decrease to below about 130° F.; and mixing the so prepared material with an oilseed extraction solvent, subjecting the resultant slurry to filtration using a cake thickness of less than about 7 inches and a filter medium having a porosity equivalent in proportion of solids retained and rate of liquid passage to a filter medium consisting of a standard mesh screen of from about 150 ot 300 mesh, and repeating the mixing with the said oilseed extraction solvent and the filtering a plurality of times.

References Cited in the file of this patent

UNITED STATES PATENTS

| 2,148,142 | Wait | Feb. 21, 1939 |
| 2,253,696 | Fouth | Aug. 26, 1941 |
| 2,438,939 | Ozai-Durrani | Apr. 6, 1948 |
| 2,484,831 | Hutchins et al. | Oct. 18, 1949 |
| 2,551,254 | Dunning | May 1, 1951 |
| 2,594,117 | Bonotto | Apr. 22, 1952 |
| 2,629,722 | Dunning | Feb. 24, 1953 |

OTHER REFERENCES

Markley: "Soybeans and Soybean Products," published by Interscience Publishers (New York), 1950. (Pages 504 and 571 relied on.)